(12) United States Patent
Tanijiri et al.

(10) Patent No.: US 6,474,809 B2
(45) Date of Patent: Nov. 5, 2002

(54) IMAGE DISPLAY APPARATUS

(75) Inventors: Yasushi Tanijiri, Osakasayama; Hiroaki Ueda, Suita; Kenji Ishibashi, Izumi; Tetsuya Noda, Tenri, all of (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/941,578

(22) Filed: Aug. 30, 2001

(65) Prior Publication Data

US 2002/0036751 A1 Mar. 28, 2002

(30) Foreign Application Priority Data

Sep. 11, 2000 (JP) .................................. 2000-274761
Apr. 2, 2001 (JP) .................................. 2001-102921

(51) Int. Cl.$^7$ ............................................ G02C 3/00
(52) U.S. Cl. ........................ 351/41; 351/155; 359/15
(58) Field of Search ........................... 351/216, 220, 351/41, 155, 231; 348/341; 359/15, 19, 487, 488, 631, 633

(56) References Cited

U.S. PATENT DOCUMENTS 4,874,214 A * 10/1989 Cheysson et al. ............ 359/15
5,886,822 A    3/1999 Spitzer
5,973,737 A * 10/1999 Yokota ........................ 348/341

FOREIGN PATENT DOCUMENTS

| EP | 0 582 229 | 2/1994 |
| JP | 11-064781 | 3/1999 |

* cited by examiner

Primary Examiner—George Manuel
(74) Attorney, Agent, or Firm—Burns, Doane, Swecker & Mathis, LLP

(57) ABSTRACT

An image display apparatus has a display section for displaying an image, an eyepiece optical system, and a transparent plate-shaped member for holding the eyepiece optical system. The image display apparatus is used with the eyepiece optical system placed in front of a viewer's eyes and with the plate-shaped member facing the eyes. The image display apparatus directs light from the display section through the eyepiece optical system to the eyes so that the viewer is presented with a virtual image of the image displayed on the display section and simultaneously permits light from the outside world to be transmitted through the plate-shaped member so as to be directed to the eyes so that the viewer is presented with an image of the outside world. The boundary surface between the eyepiece optical system and the plate-shaped member is so arranged as not to reflect light from the outside world incident thereon at angles of incidence greater than the Brewster angle toward the eyes.

24 Claims, 12 Drawing Sheets

IMAGE DISPLAY APPARATUS

This application is based on Japanese Patent Applications Nos. 2000-274761 and 2001-102921 filed respectively on Sep. 11, 2000 and Apr. 2, 2001, the contents of which are hereby incorporated by reference.

BACKGROUND OF THE INVENTION

1. Field of the Invention

The present invention relates to an image display apparatus that is used in front of a viewer's face and that presents the viewer with a displayed image along with the image of the outside world.

2. Description of the Prior Art

In recent years, image display apparatus that are used in front of a viewer's face and that direct both the light from a displayed image and the light from the outside world to the viewer's eyes so as to present the viewer with the displayed image along with the image of the outside world have been proposed as a personal data presentation apparatus. In such image display apparatus, to secure a wide visual field, a display section for displaying an image is disposed in a peripheral portion of the apparatus, and an eyepiece optical system for directing the light from the display section to the eyes and a transparent plate for holding the eyepiece optical system are disposed in front of the eyes. As the eyepiece optical system is used, for example, a reflective hologram element that reflects the light from the display section and that transmits the light from the outside world so that the image of the outside world is presented to the viewer with an enlarged virtual image of the displayed image superimposed thereon.

This type of image display apparatus is typically shaped like spectacles so that its user (the viewer) can use it in every situation in his or her daily life. For example, the user can observe displayed images while walking.

The hologram element, used as the eyepiece optical system, is affixed on the surface of the transparent plate, or embedded in the transparent plate. In the latter case, the transparent plate is produced by cementing together two component pieces having slant end surfaces, and the hologram element is affixed beforehand on the cementing surface between those two component pieces. In this arrangement, the light from the display section is introduced into the transparent plate through an edge portion thereof, and is then reflected between the opposing surfaces of the transparent plate so as to be directed to the hologram element.

However, in conventional image display apparatus, the hologram element, used as the eyepiece optical system, is so shaped as to have an edge surface substantially perpendicular to the surfaces of the transparent plate, i.e. with almost no angular difference with respect to the viewer's line of sight. As a result, some external light is reflected from the edge surface of the hologram element and enters the eyes. Similarly, some external light is reflected from the edge surface of the transparent plate and enters the eyes. Moreover, in an arrangement in which the transparent plate is produced by cementing together two component pieces, some external light is reflected from their cementing surface and enters the eyes. Such unwanted light, which would not enter the eyes if no reflection took place, enters the eyes from directions different from the directions from which it is supposed to, and thus degrades the quality of the image presented to the viewer.

Moreover, as shown in a top view in FIG. 27, in an arrangement in which the transparent plate is produced by fitting together two component pieces 13a and 13b with the gap 13g between them filled with adhesive 32 so that the two component pieces 13a and 13b are cemented together, the adhesive 32 may contract (sink in) or expand (swell out). Such contraction or expansion of the adhesive 32 refracts or diffracts the light LB from the outside world, and thereby cause unwanted light, i.e. light that is usually not supposed to enter the viewer's eyes E, to enter the eyes E, degrading the quality of the image presented. This problem arises not only with adhesive 32, but also in an arrangement in which the gap between the two component pieces 13a and 13b or a slit formed in the transparent plate is filled with a photosensitive material to form a hologram element, in which case the contraction or expansion of that material causes similar unwanted refraction and diffraction.

Although a hologram element is an optical element that offers excellent characteristics, using only one hologram element as an eyepiece optical system as in conventional image display apparatus is insufficient to achieve further enhancement of the performance of the eyepiece optical system beyond a certain limit.

SUMMARY OF THE INVENTION

An object of the present invention is to provide an image display apparatus that operates with minimum degradation of image quality due to unwanted external light, and to provide an image display apparatus furnished with an eyepiece optical system that offers excellent performance.

To achieve the above object, according to one aspect of the present invention, in an image display apparatus that is provided with a display section for displaying an image, an eyepiece optical system, and a transparent plate-shaped member for holding the eyepiece optical system, that is used with the eyepiece optical system placed in front of a viewer's eyes and with the plate-shaped member facing the eyes, and that is designed to direct light from the display section through the eyepiece optical system to the eyes so that the viewer is presented with a virtual image of the image displayed on the display section and simultaneously permit light from the outside world to be transmitted through the plate-shaped member so as to be directed to the eyes so that the viewer is presented with an image of the outside world, the boundary surface between the eyepiece optical system and the plate-shaped member is so arranged as not to reflect light from the outside world incident thereon at angles of incidence greater than the Brewster angle toward the eyes.

In general, when light is incident on the interface between two media having different refractive indices, the reflectance depends on the angle of incidence. FIGS. 26A and 26B show the relationship between the angle of incidence and the reflectance as observed in a case where the two media respectively have refractive indices of 1 and 1.5. FIG. 26A shows the reflectivity observed when light travels from the medium having the lower refractive index to the medium having the higher refractive index, and FIG. 26B shows the reflectivity observed when light travels from the medium having the higher refractive index to the medium having the lower refractive index. The angle of incidence at which the reflectivity Rp toward P-polarized light equals 0 (indicated by arrows BA) is the Brewster angle, and, when the angle of incidence with respect to the interface equals the Brewster angle, the reflected light travels perpendicularly to the transmitted light.

When the angle of incidence is smaller than the Brewster angle, both the reflectivity Rp toward P-polarized light and the reflectivity Rs toward S-polarized light are low, and thus most of the incident light is transmitted through the interface. By contrast, when the angle of incidence exceeds the Brewster angle, both the reflectivity Rp toward P-polarized light and the reflectivity Rs toward S-polarized light abruptly become high, causing most of the incident light to be reflected from the interface.

Accordingly, by designing the interface between the eyepiece optical system and the plate-shaped member not to reflect toward the eyes the light from the outside world that is incident at angles of incidence greater than the Brewster angle, it is possible to greatly reduce the amount of light from the outside world that is reflected from that interface so as to enter the eyes. In this way, it is possible to avoid degradation of the quality of the image presented to the viewer.

According to another aspect of the present invention, in an image display apparatus that is provided with a display section for displaying an image, an eyepiece optical system, and a transparent plate-shaped member for holding the eyepiece optical system, that is used with the eyepiece optical system placed in front of a viewer's eyes and with the plate-shaped member facing the eyes, and that is designed to direct light from the display section through the eyepiece optical system to the eyes so that the viewer is presented with a virtual image of the image displayed on the display section and simultaneously permit light from the outside world to be transmitted through the plate-shaped member so as to be directed to the eyes so that the viewer is presented with an image of the outside world, the eyepiece optical system is provided with two or more hologram elements, of which at least the last-stage one is held by the plate-shaped member.

According to another aspect of the present invention, in an image display apparatus that is provided with a display section for displaying an image, an eyepiece optical system, and a transparent plate-shaped member for holding the eyepiece optical system, that is used with the eyepiece optical system placed in front of a viewer's eyes and with the plate-shaped member facing the eyes, and that is designed to direct light from the display section through the eyepiece optical system to the eyes so that the viewer is presented with a virtual image of the image displayed on the display section and simultaneously permit light from the outside world to be transmitted through the plate-shaped member so as to be directed to the eyes so that the viewer is presented with an image of the outside world, a coating portion is provided to coat a plurality of members exposed on the surface of the plate-shaped member facing the viewer's eyes.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
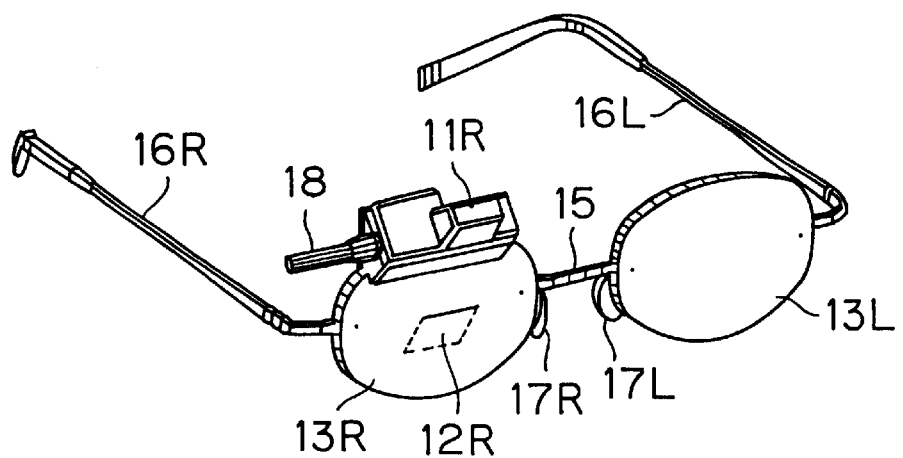
FIG. 1 is a perspective view of the image display apparatus of a first embodiment of the invention.

Hereinafter, image display apparatus embodying the present invention will be described with reference to the drawings. FIG. 1 is an external view of the image display apparatus 1 of a first embodiment. The image display apparatus 1 is provided with a display section 11R that displays an image, a reflective hologram element 12R that reflects the light from the display section 11R, a pair of transparent plate-shaped transparent plates 13L and 13R, a bridge 15 that couples together the transparent plates 13L and 13R, a pair of temples 16L and 16R, and a pair of nose pads 17L and 17R.

The image display apparatus 1 is shaped like spectacles as a whole, and is worn by its user (viewer) on his or her head with the transparent plates 13L and 13R respectively facing the left and right eyes. The temples 16L and 16R are fitted to the outer ends of the transparent plates 13L and 13R, and the nose pads 17L and 17R are fitted to the bridge 15. The temples 16L and 16R and the nose pads 17L and 17R, which are supported on the head and which support the transparent plates 13L and 13R, serve as a mounting member.

The display section 11R is fixed at the top end of the transparent plate 13R. When the image display apparatus 1 is worn, the display section 11R is located outside the visual field of the user, and thus does not obstruct it. The operation of the display section 11R is controlled by a controller (not shown) that is connected thereto via a cable 18. The transparent plates 13L and 13R, like the lenses of ordinary spectacles, have elliptic shapes, and are so sized as to cover substantially the whole visual field. The transparent plates 13L and 13R have their front surfaces (those farther from the eyes) and rear surfaces (those closer to the eyes) formed into mutually parallel flat surfaces, and thus have no optical power.

The hologram element 12R has the shape of a thin rectangular plate, and is provided inside the transparent plate 13R, near the center thereof The hologram element 12R is held by the transparent plate 13R so as to be located in front of the right eye when the image display apparatus 1 is mounted. The hologram element 12R is slanted with respect to the surfaces of the transparent plate 13R in such a way that its lower end is closer to the user's face than its upper end is when the image display apparatus 1 is mounted. The light from the display section 11R is reflected by the hologram element 12R so as to enter the right eye. On the other hand, the light from the outside world is transmitted through the transparent plate 13R so as to enter the right eye.

Figure 2:
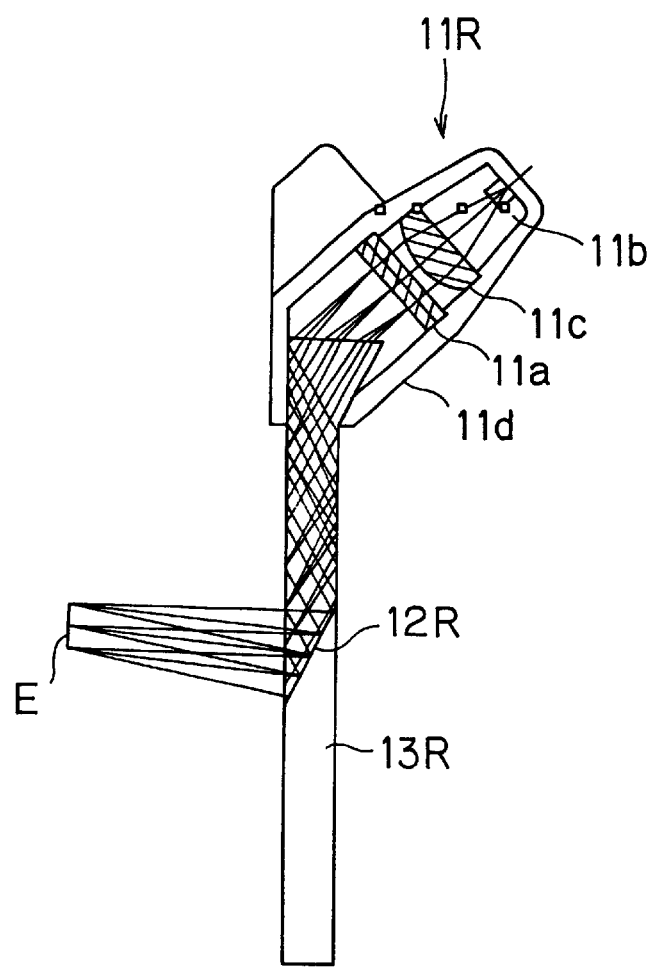
FIG. 2 is a sectional view of the display section and the transparent plate of the image display apparatus of the first embodiment.

The hologram element 12R is so configured that the light reflected therefrom represents an enlarged virtual image of the image displayed by the display section 11R, and thus functions as an eyepiece optical system. The virtual image thus presented is about ten times or more the size of the real image displayed by the display section 11R, and is located one to several meters in front of the eyes. Moreover, the hologram element 12R is also so configured as to transmit the light from the outside world. Thus, the viewer observes the virtual image of the displayed image superimposed on the image of the outside world in a central portion thereof FIG. 2 shows a sectional view of the display section 11R and the transparent plate 13R. The display section 11R is composed of a transmissive liquid crystal display (LCD) 11a, a light-emitting diode (LED) 11b, a lens 11c, and a housing 11d that houses these. The LED 11b emits light having a predetermined wavelength to illuminate the LCD 11a. The lens 11c directs the light from the LED 11b to the LCD 11a so that the whole surface of the LCD 11a is illuminated uniformly. The LCD 11a displays an image, and thereby modulates, through the lens 11c, the light fed from the LED 11b.

The upper-end portion of the transparent plate 13R is shaped like a wedge in such a way as to increasingly protrude forward toward the upper end, and the housing 11d is fixed to the transparent plate 13R in such a way as to grip the wedge-like portion thereof from the front and rear sides. The light modulated by the LCD 11a enters the transparent plate 13R through the upper-end surface thereof and then reaches the rear surface thereof The LED 11b, lens 11c, and LCD 11a are so arranged that the light reaching the rear surface of the transparent plate 13R is incident thereon at an angle of incidence greater than the critical angle, so that the light that has reached the rear surface is totally reflected. The light thus reflected from the rear surface is then totally reflected from the front surface. In this way, the light is totally reflected several times inside the transparent plate 13R, until it eventually strikes the hologram element 12R. Directing the light to the hologram element 12R by reflecting it totally several times in this manner helps make the transparent plate 13R sufficiently large and thin.

Figure 3A:
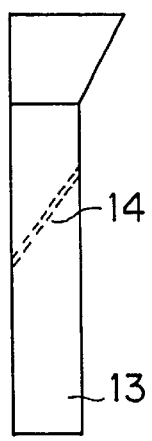
FIGS. 3A and 3B are a side view and a front view, respectively, schematically showing the transparent plate of the image display apparatus of the first embodiment.
Figure 3B:
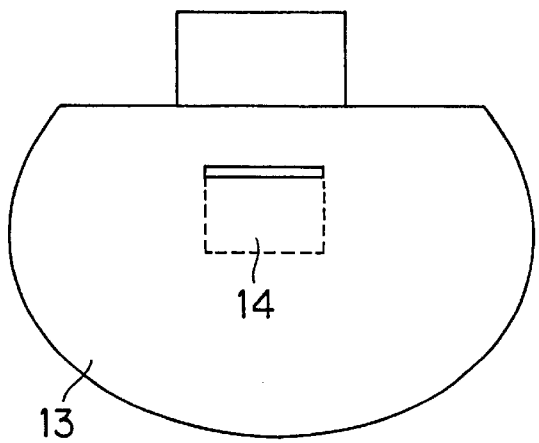

FIGS. 3A and 3B are a side view and a front view, respectively, schematically showing the transparent plate 13R. In the transparent plate 13R, a strip-shaped slit is formed so as to extend from the front to the rear surface. A transparent plate 13R so structured is produced, for example, by insert molding using a mold having a projection the same shape as the slit 14. The hologram element 12R is placed in the slit 14 with no gap left between them. The hologram element 12R is produced, for example, by pouring into the slit 14 a liquid photosensitive material that is sensitive to light and that hardens when subjected to heat or the like, then making the material harden, and then subjecting the material to hologram formation exposure. The hologram element 12R is formed out of a material of which the refractive index after hardening is equal to that of the transparent plate 13R, so that the hologram element 12R and the transparent plate 13R have equal refractive indices.

Thin plate though the hologram element 12R is, it has four edge surfaces. The upper and lower (i.e. front and rear) edge surfaces appear at the surfaces of the transparent plate 13R, and thus form interfaces between the hologram element 12R and air. These edge surfaces are so finished as to be flush with the front and rear surfaces, respectively, of the transparent plate 13R, and are thus close to perpendicular to the viewer's line of sight. As a result, no light from the outside world is reflected from the front or rear edge surface of the hologram element 12R so as to enter the eyes.

On the other hand, the left and right edge surfaces form interfaces between the hologram element 12R and the transparent plate 13R, and are thus in contact with the transparent plate 13R. These edge surfaces are perpendicular to the front and rear surfaces of the transparent plate 13R, and are thus close to parallel to the viewer's line of sight. Accordingly, if these surfaces should reflect light from the outside world, the reflected light may enter the eyes. However, as described above, the hologram element 12R and the transparent plate 13R have equal refractive indices, and therefore, in optical terms, the left and right edge surfaces of the hologram element 12R are as good as non-existent; that is, no light from the outside world is reflected there.

The upper and lower (i.e. rear and front) surfaces of the hologram element 12R also form interfaces between the hologram element 12R and the transparent plate 13R, and are thus in contact with the transparent plate 13R. These surfaces are slanted at a great angle with respect to the viewer's line of light, and therefore, even if they reflect light from the outside world, the reflected light does not enter the eyes. Moreover, for the same reason as stated above, it can safely be said that, in optical terms, those surfaces are as good as non-existent; that is, light from the outside world is only transmitted. In this way, no light from the outside world is reflected from any interface between the hologram element 12R and the transparent plate 13R so as to enter the eyes, and no light is reflected from any interface between the hologram element 12R and ambient air so as to enter the eyes.

The front and rear surfaces of the transparent plate 13R are close to perpendicular to the viewer's line of sight, and therefore no light from the outside world is reflected therefrom so as to enter the eyes. On the other hand, the peripheral edge surface of the transparent plate 13R is close to parallel to the viewer's line of sight, and therefore some light from the outside world that has been transmitted through the front surface may be reflected from the peripheral edge surface so as to enter the eyes. To prevent this from happening, the whole peripheral edge surface of the transparent plate 13R is covered with an anti-reflection film. That is, the light from the outside world that has been transmitted through the front surface is transmitted through the peripheral edge surface. Thus, no light is reflected from the interface between the transparent plate 13R and air so as to enter the eyes.

In the image display apparatus 1 configured as described above, no light from the outside world is reflected so as to enter the eyes from directions different from the directions from which it is supposed to enter the eyes, and thus no degradation of the quality of the image presented results from such unwanted light. Alternatively, it is also possible to make the transparent plate 13R so large that no part of its peripheral edge surface comes into the visual field and thereby omit the anti-reflection film. Since the light from the display section 11R is directed to the hologram element 12R by being reflected between the front and rear surfaces of the transparent plate 13R, it is easy to make the transparent plate 13R large enough to achieve that. In addition, even when the transparent plate 13R is made larger, its thickness need not be increased, and thus it is possible to keep the image display apparatus 1 as a whole satisfactorily lightweight.

It is to be noted that, in the following descriptions of the image display apparatus of other embodiments of the invention, such constituent components as serve the same or similar purposes as in the image display apparatus 1 are identified with the same reference numerals, and overlapping explanations will not be repeated.

Figure 4:
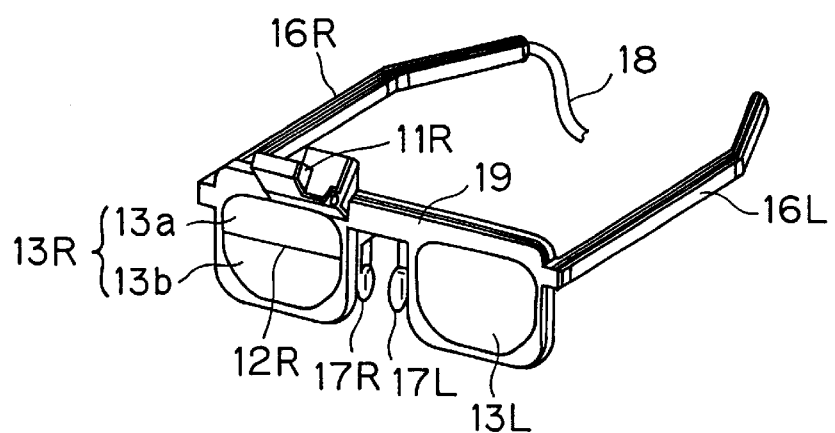
FIG. 4 is a perspective view of the image display apparatus of a second embodiment of the invention.

FIG. 4 shows an external view of the image display apparatus 2 of a second embodiment. The image display apparatus 2 is a modified version of the image display apparatus 1, and differs therefrom in that the transparent plates 13L and 13R are fixed to a frame 19, and that the transparent plate 13R and the hologram element 12R held thereby are structured differently. The temples 16L and 16R and the nose pads 17L and 17R are fitted to the frame 19. The cable 18 is housed inside the temple 16R, exiting therefrom at the rear end thereof so as to be connected to a controller.

The transparent plate 13R is produced by cementing together two transparent plate-shaped component pieces 13a and 13b. The hologram element 12R is provided on the cementing surface between the component pieces 13a and 13b, and reaches the left and right ends of the transparent plate 13R. This makes it possible to present an image that is wide in the horizontal direction.

Figure 5A:
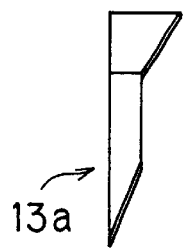
FIGS. 5A and 5B are a side view and a front view, respectively, schematically showing one of the component pieces constituting the transparent plate of the image display apparatus of the second embodiment.
Figure 5B:
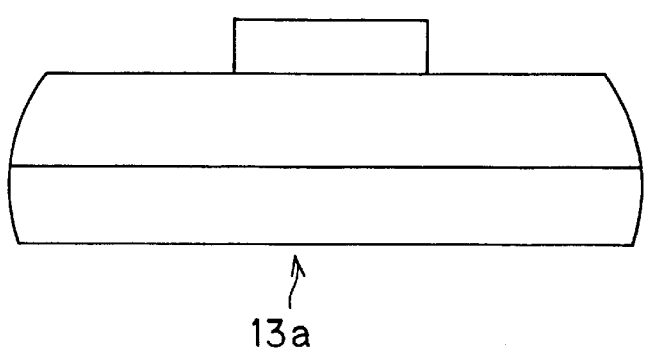

FIGS. 5A and 5B are a side view and a front view, respectively, of the upper component piece 13a. The component piece 13a is elongate, and its semifinished version is formed, for example, by extrusion molding. The hologram element 12R is produced by sticking a thin-plate-shaped photosensitive material on the slant surface of the semifinished component piece 13a, and then subjecting the material to hologram formation exposure as the semifinished component piece 13a is moved in the direction in which it is extrusion-molded. After the exposure, the semifinished component piece 13a and the semifinished component piece 13b are cemented together with UV adhesive, and are then formed, by cutting, into the transparent plate 13R having the shape of a spectacles lens. This method eliminates the need to position the component piece 13a and the hologram element 12R relative to each other. Alternatively, it is also possible to apply a liquid photosensitive and simultaneously adhesive material to the slant surface of the semifinished component piece 13a and then subject the material to hologram formation exposure after the material has hardened.

In the image display apparatus 2, no part of the interface between the hologram element 12R and the transparent plate 13R makes a small angle with respect to the viewer's line of sight, and therefore no light from the outside world is reflected from the interface so as to enter the eyes. Moreover, the edges of the hologram element 12R and of the transparent plate 13R are set in the grooves of the frame 19, and therefore no light from the outside world is reflected from those edge surfaces so as to enter the eyes.

Figure 6:
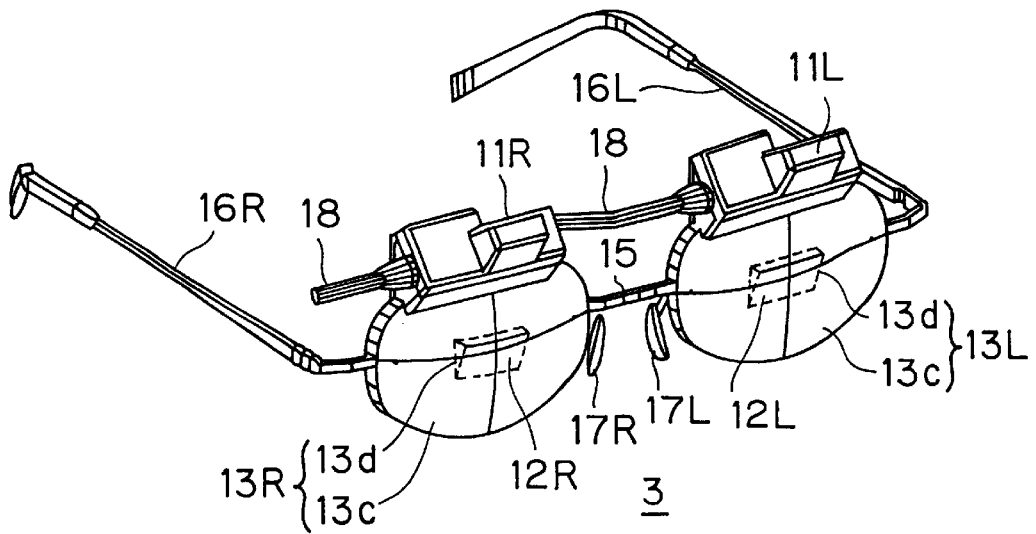
FIG. 6 is a perspective view of the image display apparatus of a third embodiment of the invention.

FIG. 6 shows an external view of the image display apparatus 3 of a third embodiment. In the image display apparatus 3, a hologram element 12L and a display section 11L are provided also for the transparent plate 13L so that an image is presented to both eyes. By making the two display sections 11L and 11R display images with parallax, it is possible to present a stereoscopic image. The display sections 11L and 11R both have their front and rear surfaces curved so as to have optical powers, offering the function of correcting the dioptric power of the viewer. This permits even a person with poor eyesight to observe sharp images without using a separate means of correcting the eyesight.

Figure 7:
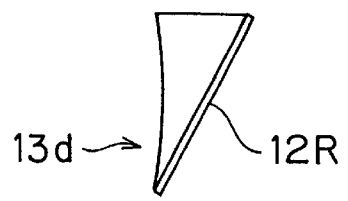
FIG. 7 is a side view schematically showing one of the component pieces constituting the transparent plate of the image display apparatus of the third embodiment.

The transparent plates 13L and 13R are each composed of a transparent plate-shaped component piece 13c and a transparent prism-shaped component piece 13d. The component piece 13d is embedded in the component piece 13c, with only the rear surface of the former exposed at the rear surface of the latter. FIG. 7 is a side view of the component piece 13d. The transparent plates 13L and 13R are each produced by placing the component piece 13d, having the hologram element 12L or 12R provided on the surface thereof, inside a mold, and then injection-molding the component piece 13c by using that mold.

The component pieces 13c and 13d are formed out of materials having equal refractive indices. Thus, although some of the interfaces between the component pieces 13c and 13d are close to parallel to the viewer's line of sight, no light from the outside world is reflected from the interfaces between the component pieces 13c and 13d so as to enter the eyes. Moreover, the hologram elements 12L and 12R are formed out of a material having a refractive index equal to that of the component pieces 13c and 13d. Thus, no light from the outside world is reflected from the interfaces between the hologram elements 12L and 12R and the transparent plates 13L and 13R so as to enter the eyes. As in the image display apparatus 1, the peripheral edge surfaces of the transparent plates 13L and 13R are covered with anti-reflection films.

The component pieces 13d are integrated with the component pieces 13c, and therefore may be formed in any shape; for example they may be formed in the shape of a plate. In that case, embedding the whole component pieces 13d in the component pieces 13c give the transparent plates 13L and 13R optical powers. Alternatively, it is also possible to use transparent plates that are produced by molding with only hologram elements placed inside the molds. This produces transparent plates that have no counterparts of the component pieces 13d but that are optically equivalent to the transparent plates 13L and 13R.

Figure 8:
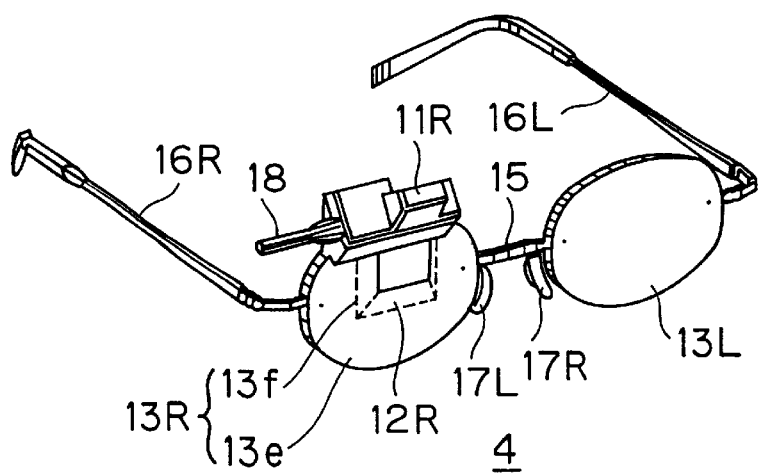
FIG. 8 is a perspective view of the image display apparatus of a fourth embodiment of the invention.

FIG. 8 shows an external view of the image display apparatus 4 of a fourth embodiment. This image display apparatus 4 differs from the image display apparatus 1 of the first embodiment in that the transparent plate 13R is structured differently. The transparent plate 13R is produced by cementing together two transparent plate-shaped component pieces 13e and 13f with transparent adhesive.

Figure 9A:
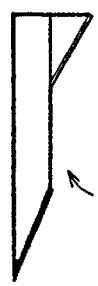
FIGS. 9A, 9B, and 9C are a side view, a front view, and a horizontal sectional view, respectively, schematically showing one of the component pieces constituting the transparent plate of the image display apparatus of the fourth embodiment.
Figure 9B:
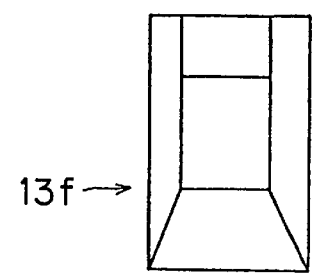
Figure 9C:

FIGS. 9A, 9B, and 9C are a side view, a front view, and a horizontal sectional view, respectively, of the component piece 13f The component piece 13f has, at all its surfaces at which it is cemented to the component piece 13e, slant surfaces, and its horizontal section has the shape of a trapezoid of which the width increases toward the back. The hologram element 12R is sticked on the lower slant surface. The angles of the left and right slant surfaces with respect to the front surface are determined in such a way that, of the light incident thereon from the outside world through the front surface, rays of which the angles of incidence are greater than the Brewster angle are reflected from the left and right slant surfaces in directions other than the directions that lead to the eyes, with the refractive indices of the component pieces 13e and 13f also taken into consideration.

Figure 10:
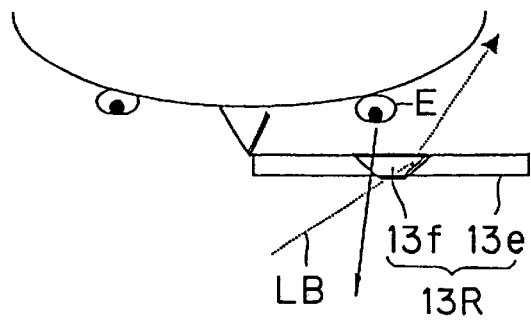
FIG. 10 is a diagram schematically showing the positional relationship between the transparent plate and the eyes when the image display apparatus of the fourth embodiment is used.

FIG. 10 schematically shows the relationship between the transparent plate 13R and the eyes when the image display apparatus 4 is being used. Even if light LB from the outside world is incident through the front surface of the component piece 13f on the interfaces between the component pieces 13e and 13f at angles of incidence greater than the Brewster angle and is reflected from those surfaces, this light does not enter the eyes E. Moreover, only a slight amount of light is incident on the interfaces between the component pieces 13e and 13f at angles of incidence smaller than the Brewster angle, and this light is reflected from those surfaces at a low reflectivity. Thus, almost no light is reflected from the interfaces between the component pieces 13e and 13f so as to enter the eyes. The left and right edge surfaces of the hologram element 12R are so formed as to be flush with the left and right slant surfaces of the component piece 13f. Thus, almost no light from the outside world is reflected from the interfaces between the hologram element 12R and the transparent plate 13R so as to enter the eyes.

In this image display apparatus 4 configured as described above, it is possible to use, as the component pieces 13e and 13f constituting the transparent plate 13R, component pieces having different refractive indices, and it is also possible to use, as the adhesive with which the component pieces 13e and 13f are cemented together, an adhesive having a different refractive index from the component pieces 13e and 13f This permits a wider choice of materials. Moreover, since the cementing surfaces are slanted, the component pieces 13e and 13f can be easily cemented together simply by pressing the component piece 13f onto the component piece 13e with adhesive applied thereto, and the position of the hologram element 12R inside the transparent plate 13R is determined automatically.

As described earlier, the edge surface of the transparent plate 13R is covered with an anti-reflection film, and therefore no light from the outside world is reflected from the edge surface of the transparent plate 13R so as to enter the eyes. Instead of providing the antireflection film, it is also possible, as with the component pieces 13e and 13f, to set the angle of the edge surface of the transparent plate 13R with respect to the eyes in such a way that light from the outside world that is incident thereon at angles of incidence greater than the Brewster angle is reflected therefrom in directions other than the directions that lead to the eyes. In that case, the angle of the edge surface is determined with the difference in refractive index between the component piece 13e and air taken into consideration. This method can be adopted also in the image display apparatus 1 and 3 of the first and third embodiment.

Figure 11A:
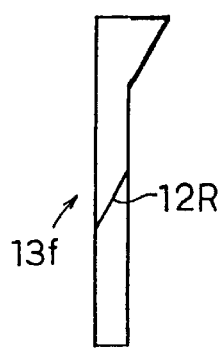
FIGS. 11A and 11B are a side view and a front view, respectively, of the transparent plate of the image display apparatus of a fifth embodiment of the invention.
Figure 11B:
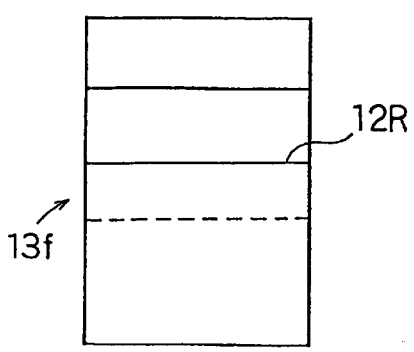

The image display apparatus of a fifth embodiment of the invention will be described below. The image display apparatus of this embodiment differs from the image display apparatus 4 of the fourth embodiment in that the transparent plate 13R and the hologram element 12R are structured differently, namely that the hologram element 12R is formed inside the component piece 13f, and in addition that, as shown in FIGS. 11A and 11B, the side edge surfaces and the lower edge surface of the component piece 13f are formed so as to be substantially perpendicular to the viewer's line of sight.

Figure 12A:
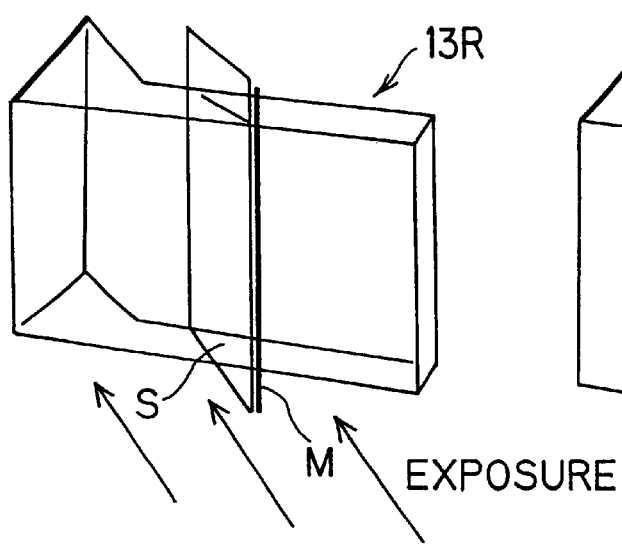
FIGS. 12A and 12B are diagrams schematically showing the production process of the hologram element of the image display apparatus of the fifth embodiment.
Figure 12B:
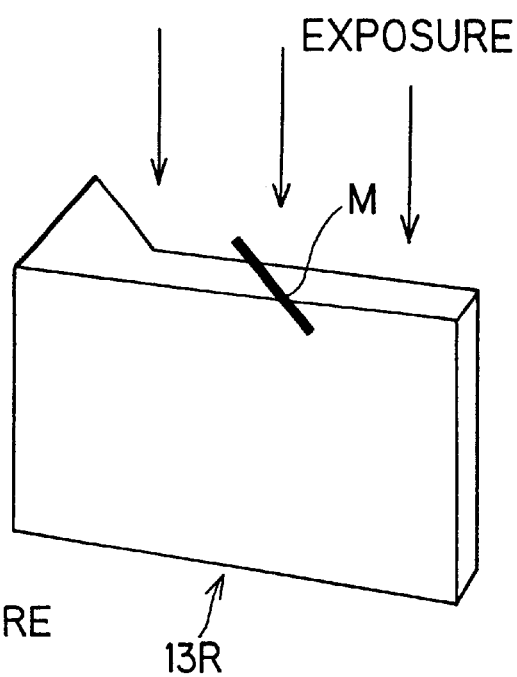

The hologram element 12R and the component piece 13f are formed integrally out of an identical material. FIGS. 12A and 12B schematically show the production method of the hologram element 12R. First, the semifinished version of the component piece 13f is formed by molding a transparent material containing a photosensitive agent. Next, as shown in FIG. 12A or 12B, a narrow strip-shaped mask M is laid on the surface of that portion of the semifinished component piece 13f where the hologram element 12R is to be formed, and the semifinished component piece 13f is subjected to exposure. Here, the exposure is performed in such a way as not to produce interference fringes. This yields the component piece 13f as a mere transparent optical element, with the photosensitive material in the shade S of the mask M left unexposed in the shape of a thin plate inside the component piece 13f. Lastly, the unexposed photosensitive material is subjected to hologram formation exposure to form the hologram element 12R.

This method does not produce a difference in refractive index between the hologram element 12R and the component piece 13f, and therefore no light from the outside world is reflected from the interfaces between them so as to enter the eyes. Moreover, the component pieces 13e and 13f (see FIG. 8) are formed out of materials having equal refractive indices, and the component pieces 13e and 13f are cemented together with adhesive having a refractive index equal to that of the component pieces 13e and 13f Thus, light incident on the side edge surfaces and the lower edge surface of the component piece 13f is transmitted through the adhesive and the component piece 13e, which are formed out of the optically identical material to the component piece 13f; that is, such light is not reflected so as to enter the eyes. The transparent plate 13R may be formed by integrally molding the component pieces 13e and 13f. The edge surfaces of the hologram element 12R and the peripheral edge surface of the transparent plate 13R, i.e. the interfaces between these components and air, are covered with anti-reflection films in the same manner as described earlier.

The semifinished component piece 13f may be subjected to exposure from the rear surface thereof as shown in FIG. 12A, or from a side surface thereof as shown in FIG. 12B; it may also be subjected to exposure from the front surface thereof It is preferable, however, to subject the semifinished component piece 13f to exposure from the rear or front surface thereof because doing so makes it easier to form the hologram element 12R in uniform thickness.

The wedge-shaped upper end portion of the transparent plate 13R, where the display section 11R is fixed, may be formed separately from the other, flat-plate-shaped, portion thereof. In that case, the upper end portion and the flat-plate-shaped portion are formed out of materials having equal refractive indices, and are cemented together with adhesive having an equal refractive index.

Figure 13:
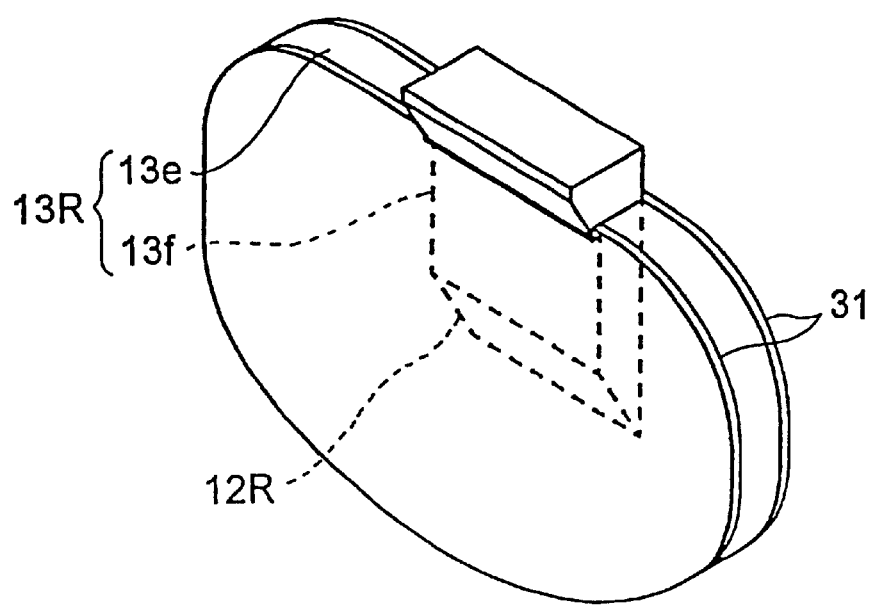
FIG. 13 is a perspective view of the transparent plate of the image display apparatus of a sixth embodiment of the invention.
Figure 14:
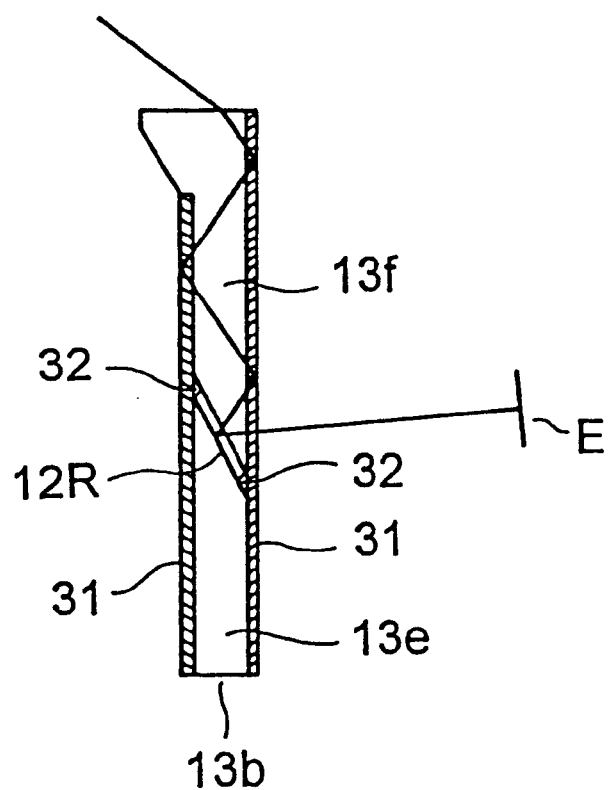
FIG. 14 is a side sectional view of the transparent plate of the image display apparatus of the sixth embodiment.
Figure 15:
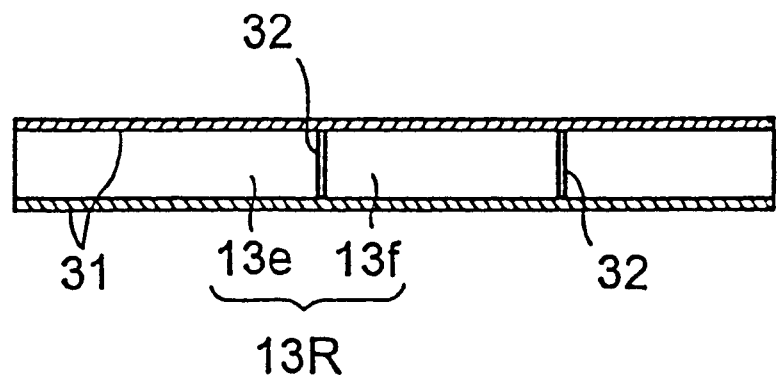
FIG. 15 is a top sectional view of the transparent plate of the image display apparatus of the sixth embodiment.

The image display apparatus of a sixth embodiment of the invention will be described below. The image display apparatus of this embodiment is structured in a similar manner to the image display apparatus 4 of the fourth embodiment shown in FIG. 3 described earlier. FIGS. 13, 14, and 15 are a perspective view, a side sectional view, and a top sectional view, respectively, of the transparent plate 13R of this embodiment. As these figures show, here, as in the image display apparatus 4 of the fourth embodiment, the transparent plate 13R is produced by cementing together two component pieces 13e and 13f.

As in the fifth embodiment (see FIG. 11), the left and right side edge surfaces of the component piece 13f are formed so as to be substantially perpendicular to the viewer's line of sight, and the hologram element 12R is sticked on the slant surface of the component piece 13f. In addition, transparent films 31 (coating portions) are formed all over the front and rear surfaces of the flat-plate-shaped portion of the transparent plate 13R.

The component pieces 13f and 13e are formed out of materials having equal refractive indices, and are cemented together with adhesive 32 having a refractive index equal to that of the component pieces 13f and 13e. Thus, light incident on the left and right side edge surfaces of the component piece 13f is transmitted through the adhesive 32 and the component piece 13e, which are formed out of optically identical materials to the component piece 13f; that is, such light is not reflected so as to enter the eyes. The peripheral edge surface of the transparent plate 13R is covered with an anti-reflection film in the same manner as described earlier.

The cementing surfaces between the hologram element 12R and the component pieces 13e and 13f make great angles with respect to the viewer's line of sight, and therefore, even if reflection takes place at the interfaces between the hologram element 12R and the component pieces 13e and 13f due to a difference in their refractive indices, no light incident at angles of incidence greater than the Brewster angle is reflected from those interfaces so as to enter the eyes.

The transparent films 31 are formed by placing the component pieces 13e and 13f and the hologram element 12R inside a metal or glass mold, and then performing injection molding by filling that mold with a UV-curing resin having a refractive index equal to that of the component pieces 13e and 13f. This forms the transparent films 31 into desired surface shapes. Simultaneously, the gap between the component pieces 13f and 13e is filled with the UV-curing resin as adhesive 32, and the gap, together with the component pieces 13f and 13e themselves, is covered with the transparent films 31.

As a result, no irregularities (bumps and dips) develop on the surfaces of the transparent films 31 due to contraction or expansion of the adhesive 32 as it hardens, and thus it is possible to make the surfaces of the transparent films 31 smooth without irregularities. This prevents light incident on the gap from entering the eyes by being transmitted through the adhesive 32, hologram element 12R, and component piece 13e, which have equal refractive indices, without being refracted or diffracted.

By forming the transparent films 31 as thin films having a thickness of about 100 μm or less, it is possible to make their influence on optical performance negligibly small. This makes it possible to tolerate relatively large errors in their thickness. Moreover, whereas the fact that the transparent films 31 have a refractive index equal to that of the transparent plate 13R makes designing easier by eliminating the need to consider refraction that takes place on the interface surfaces, the fact that the image light advances by being reflected between the surfaces of the transparent films 31 makes it necessary to consider the thickness of the transparent films 31 in designing the optical path length.

The transparent films 31 may be formed by sticking optical films on the transparent plate 13R. By placing the component pieces 13e and 13f in predetermined positions, then sticking the optical films thereon, and then filling the gap between the component pieces 13e and 13f with the adhesive 32, it is possible to prevent contraction or expansion of the adhesive 32. This offers the same effects as described above. It is preferable to use, as the optical films, anti-reflection films.

Not only in an arrangement like the one described just above in which the gap between the two component pieces 13e and 13f is filled with the adhesive 32, but also in an arrangement like that of the first embodiment in which the slit 14 (see FIG. 3) is filled with adhesive or a photosensitive material for forming the hologram element 12R, covered the plate-shaped member and the hologram element or the like simultaneously with transparent films 31 offers the same effects as described above.

Figure 16:
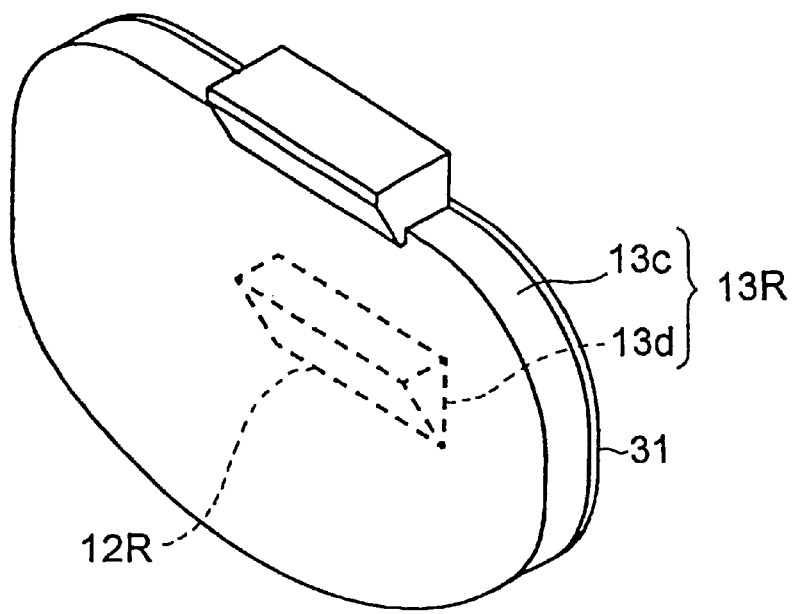
FIG. 16 is a perspective view of the transparent plate of the image display apparatus of a seventh embodiment of the invention.
Figure 17:
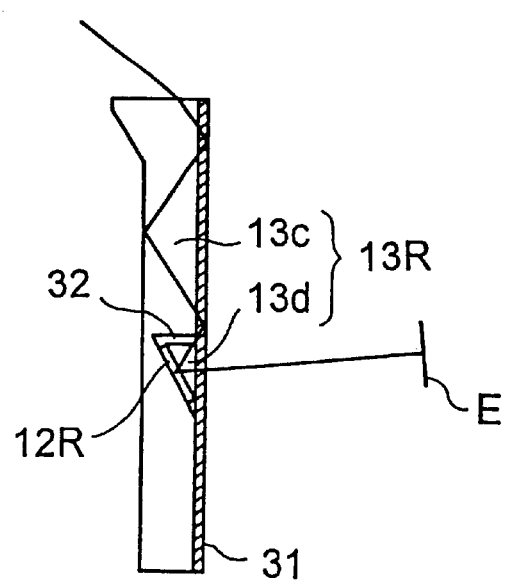
FIG. 17 is a side sectional view of the transparent plate of the image display apparatus of the seventh embodiment.

The image display apparatus of a seventh embodiment of the invention will be described below. The image display apparatus of this embodiment is structured in a similar manner to the image display apparatus 3 of the third embodiment shown in FIG. 6 described earlier. As a perspective view in FIG. 16 and a side sectional view in FIG. 17 show, the transparent plate 13R is produced by embedding the component piece 13d having the hologram element 12R sticked thereon in the component piece 13c, and cementing them together with adhesive 32. On the rear surface of the transparent plate 13R, a transparent film 31 similar to those used in the sixth embodiment is formed. The component pieces 13c and 13d and the adhesive 32 have equal refractive indices.

Also in this arrangement, the gap between the component pieces 13c and 13d, which is filled with the adhesive 32, is, together with the component pieces 13c and 13d, covered with a transparent film 31 formed by resin molding or out of an optical film. As a result, no irregularities develop on the surface of the transparent film 31 due to contraction or expansion of the adhesive 32 as it hardens, and thus it is possible to make the surface of the transparent film 31 smooth without irregularities. As in the sixth embodiment, this prevents light incident on the gap from entering the eyes without being refracted or diffracted.

Figure 18:
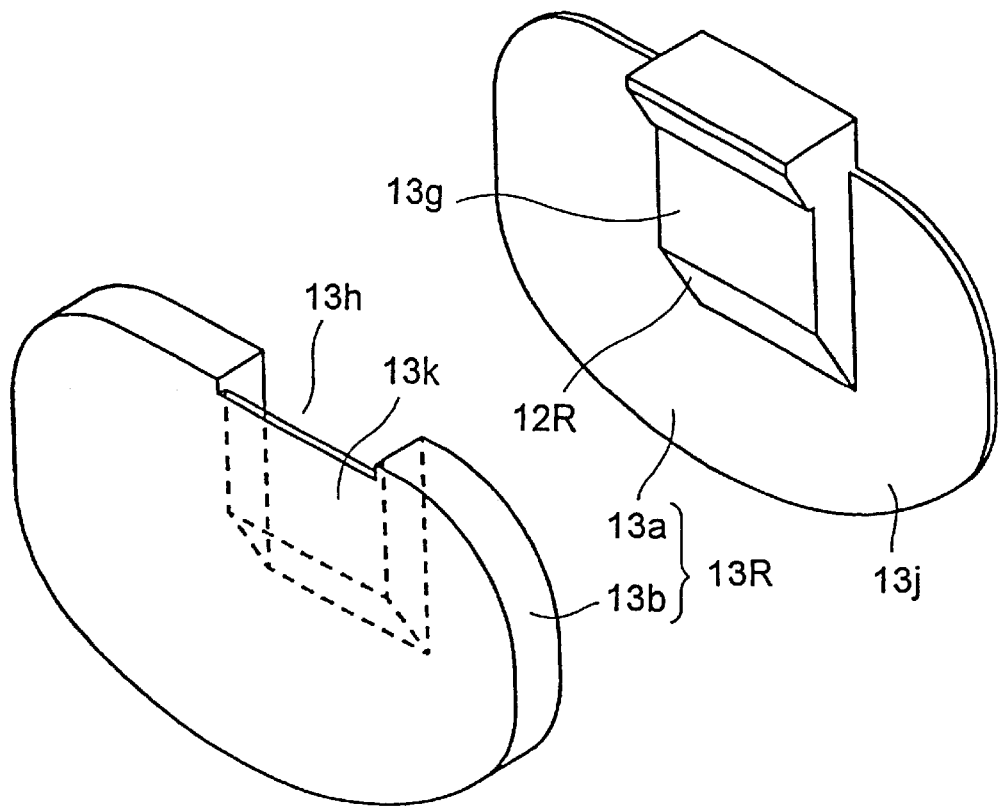
FIG. 18 is an exploded perspective view of the transparent plate of the image display apparatus of an eighth embodiment of the invention.
Figure 19:
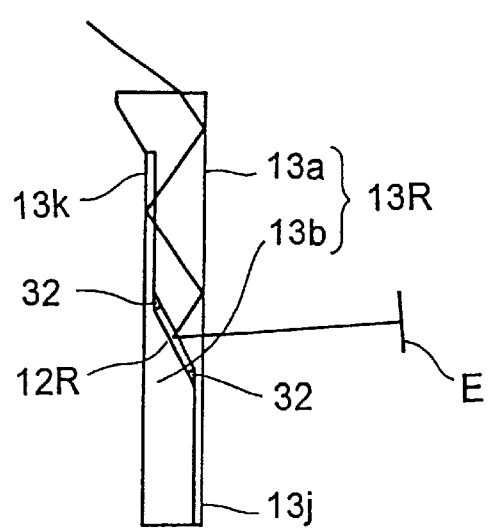
FIG. 19 is a side sectional view of the transparent plate of the image display apparatus of the eighth embodiment.

The image display apparatus of an eighth embodiment of the invention will be described below. The image display apparatus of this embodiment is structured in a similar manner to the image display apparatus of the sixth embodiment. As an exploded perspective view in FIG. 18 and a side sectional view in FIG. 19 show, the component pieces 13a and 13b have flat-plate-shaped portions 13j and 13k that are substantially perpendicular to the viewer's line of sight. The component pieces 13a and 13b are cemented together with adhesive 32, with the projecting portion 13g of the component piece 13a, i.e. the one having the hologram element 12R, fitted in the recessed portion 13h of the component piece 13b. The component pieces 13a and 13b and the adhesive 32 have equal refractive indices, In this arrangement, the gap between the projecting portion 13g and the recessed portion 13h is covered with the flat-plate-shaped portions 13j and 13k. As a result, no irregularities develop on the surface of the transparent plate 13R due to contraction or expansion of the adhesive 32 as it hardens, and thus it is possible to make the surfaces of the transparent plate 13R smooth without irregularities. This prevents light incident on the gap from entering the eyes by being transmitted through the adhesive 32, hologram element 12R, and component piece 13e, which have equal refractive indices, without being refracted or diffracted. In this way, the flat-plate-shaped portions 13j and 13k act like the transparent films 31 of the sixth embodiment, and thus can be regarded as transparent films 31 formed integrally with the component pieces 13a and 13b. This eliminates the need to separately provide transparent films 31 such as optical films, and thus helps reduce the number of components.

Figure 20:
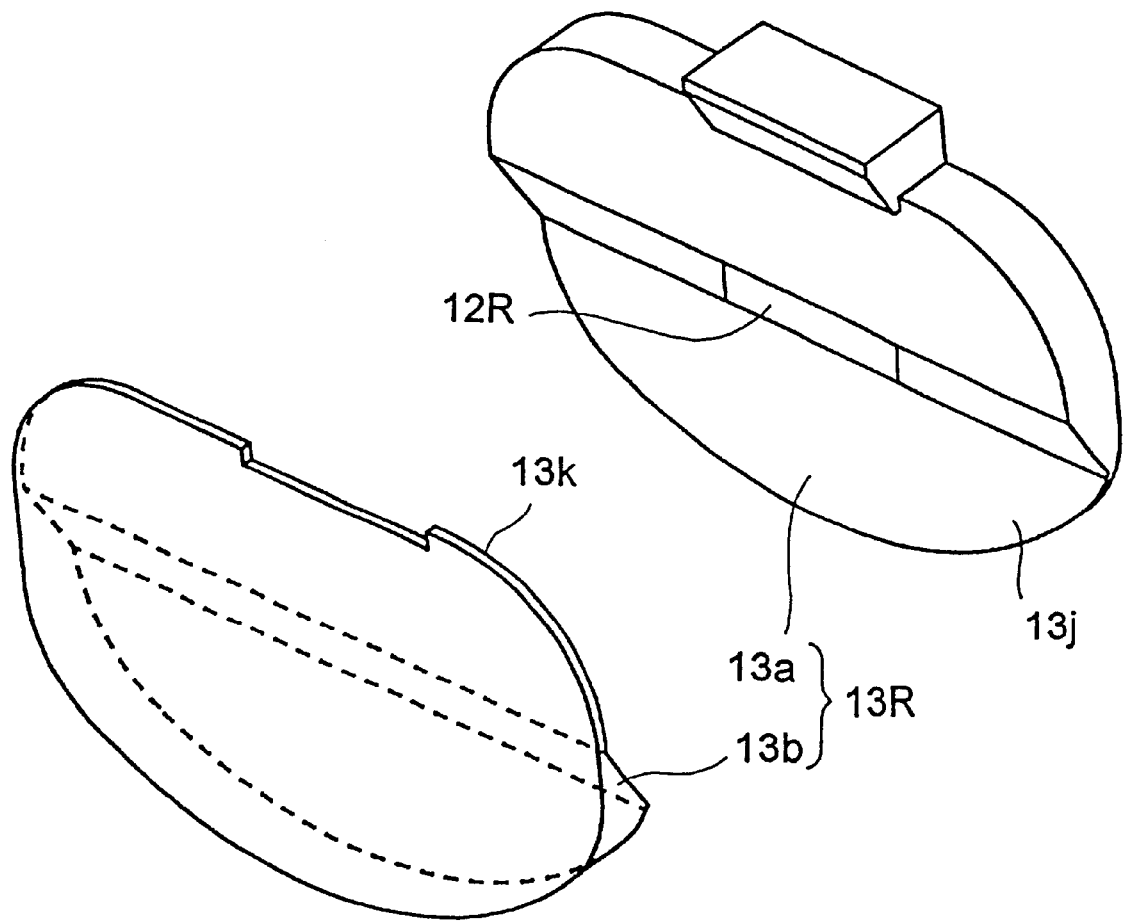
FIG. 20 is an exploded perspective view of the transparent plate of the image display apparatus of a ninth embodiment of the invention.

The image display apparatus of a ninth embodiment of the invention will be described below. As an exploded perspective view in FIG. 20 shows, in the image display apparatus of this embodiment, as in the image display apparatus of the eight embodiment, the component pieces 13a and 13b have flat-plate-shaped portions 13j and 13k that are substantially perpendicular to the viewer's line of sight. The component pieces 13a and 13b are cemented together with adhesive 32 (not shown), with the slant surface of the component piece 13a, i.e. the one having the hologram element 12R, facing the slant surface of the component piece 13b. The component pieces 13a and 13b and the adhesive 32 have equal refractive indices. This arrangement offers the same effects as that of the eighth embodiment.

Figure 21:
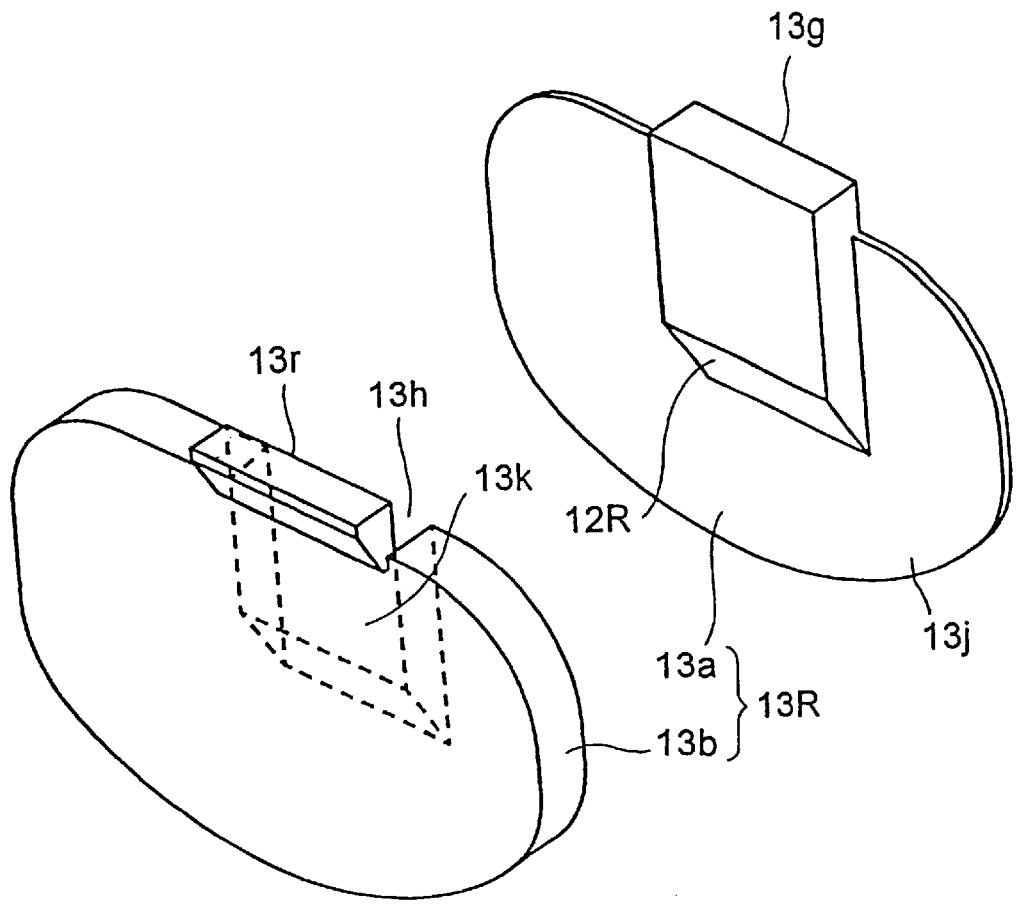
FIG. 21 is an exploded perspective view of the transparent plate of the image display apparatus of a tenth embodiment of the invention.
Figure 22:
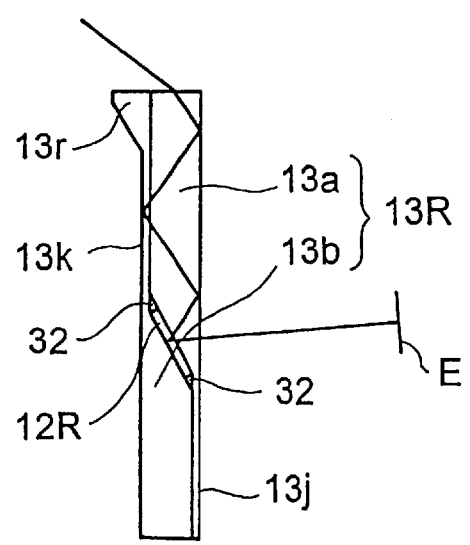
FIG. 22 is a side sectional view of the transparent plate of the image display apparatus of the tenth embodiment.

The image display apparatus of a tenth embodiment of the invention will be described below. As an exploded perspective view in FIG. 21 and a side sectional view in FIG. 22 show, in the image display apparatus of this embodiment, as in the image display apparatus of the eight embodiment, the component pieces 13a and 13b have flat-plate-shaped portions 13j and 13k that are substantially perpendicular to the viewer's line of sight. This embodiment differs from the eighth embodiment, however, in that a fitting portion 13r on which the display section 11R (see FIG. 8) is fitted is formed integrally with the component piece 13b.

The component pieces 13a and 13b are cemented together with adhesive 32, with the projecting portion 13g of the component piece 13a, i.e. the one having the hologram element 12R, fitted in the recessed portion 13h of the component piece 13b. The component pieces 13a and 13b, the hologram element 12R, and the adhesive 32 have equal refractive indices. This arrangement offers the same effects as that of the eighth embodiment.

Figure 23:
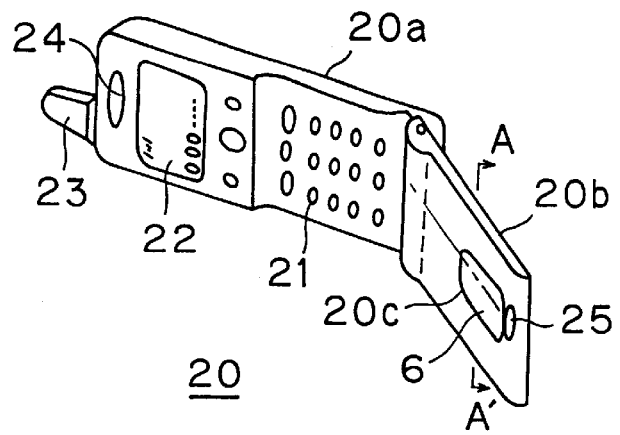
FIG. 23 is a perspective view of a cellular phone incorporating the image display apparatus of an eleventh embodiment of the invention.

The image display apparatus 6 of an eleventh embodiment of the invention will be described below. The image display apparatus 6 is built in a cellular phone, and serves to present the user with data received and data to be transmitted in the form of images. FIG. 23 shows an external view of a cellular phone 20 incorporating the image display apparatus 6. The cellular phone 20 is composed of a body portion 20a and a flap portion 20b, and, when the cellular phone 20 is not in use, the flap portion 20b is folded up so as to overlap the body portion 20a.

The body portion 20a, which mainly controls the telephony-related functions of the cellular phone 20, incorporates a signal processing circuit, and is provided with a plurality of keys 21 for permitting entry of a telephone number and the like, a liquid crystal display 22 for displaying the telephone number entered, an antenna for transmitting and receiving a radio wave, a loudspeaker for outputting received voice, and other components. The flap portion 20b is provided with a microphone for sensing voice, and incorporates the image display apparatus 6. The flap portion 20b has a window 20c formed in the inner surface thereof, and has a window formed also in the outer surface thereof so as to face the window 20c.

Figure 24:
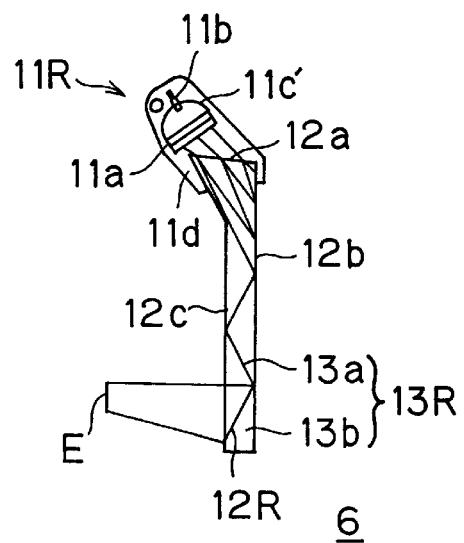
FIG. 24 is a sectional view of the image display apparatus of the eleventh embodiment.

FIG. 24 is a sectional view of the image display apparatus 6, taken along line A–A' shown in FIG. 23. The image display apparatus 6 is composed of a display section 11R, a hologram element 12R, and a transparent plate 13R. The display section 11R is structured in a similar manner to those of the embodiments described hereinbefore, but differs therefrom in that it is provided with, instead of a lens, a reflector 11c' that leads the light from an LED 11b to an LCD 11a.

The transparent plate 13R, like that of the second embodiment, is formed by cementing together two component pieces 13a and 13b, and the hologram element 12R is provided on the slant surface of the component piece 13a which forms the cementing surface between the component pieces 13a and 13b. The wedge-shaped portion of the transparent plate 13R, on which the display section 11R is fixed, projects toward the body portion 20a.

The image display apparatus 6 is housed inside the flap portion 20b with the transparent plate 13R facing the window 20c. The user, while making a call by using the cellular phone 20 held in the hand with the transparent plate 13R and the window 20c located in front of the eyes and with the loudspeaker 24 located near the ear, can observe the image of the outside world together with an image superimposed thereon. Even when the cellular phone 20 is used in this state, the user's voice is sensed by the microphone 25.

On the edge surface of the component piece 13a of the transparent plate 13R on which the light from the LCD 11a is incident is provided a transmissive hologram element 12a. On the front and rear surfaces of the component piece 13a which guide the incident light by reflecting it are provided reflective hologram elements 12b and 12c, respectively. These hologram elements 12a, 12b, and 12c, together with the hologram element 12R, constitute an eyepiece optical system that presents an enlarged virtual image of the image displayed on the LCD 11a.

The hologram element 12R serves as the last-stage element of the eyepiece optical system. In the image display apparatus 6, the eyepiece optical system is composed of a plurality of hologram elements in this way, and therefore, as compared with the image display apparatus of the first to tenth embodiments in which the eyepiece optical system is composed solely of a hologram element 12R, the aberration of the light representing the image can be suppressed satisfactorily, and the magnification factor of the image can be set freely.

The hologram elements 12b and 12c provided on the front and rear surfaces of the component piece 13a are, like the hologram element 12R, so configured as to transmit the light from the outside world and reflect, by diffraction, the light incident thereon after being transmitted through the hologram element 12a. By configuring the front and rear surfaces of the transparent plate 13R to reflect light without totally reflecting it in this way, it is possible to eliminate the need to make the angle of incidence at which light is incident on the front and rear surfaces greater than the critical angle, and thereby make it easier to set the angle of the display section 11R with respect to the transparent plate 13R.

Hologram elements are provided also on the left and right edge surfaces of the component piece 13a. These hologram elements are so configured that, of the light incident on those edge surfaces after being transmitted through the front surface, rays incident at angles of incidence greater than the Brewster angle are reflected from the hologram elements in directions other than the directions that lead to the eyes.

Figures 25A, 25B:
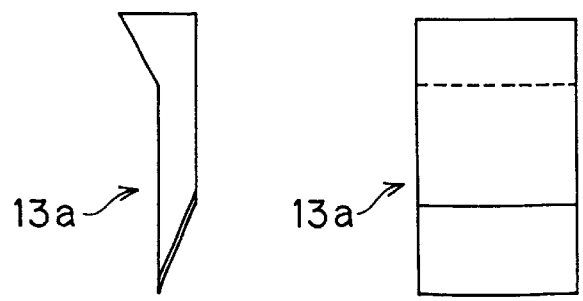
FIGS. 25A and 25B are a side view and a front view, respectively, schematically showing one of the component pieces constituting the transparent plate of the image display apparatus of the eleventh embodiment.
Figure 26A:
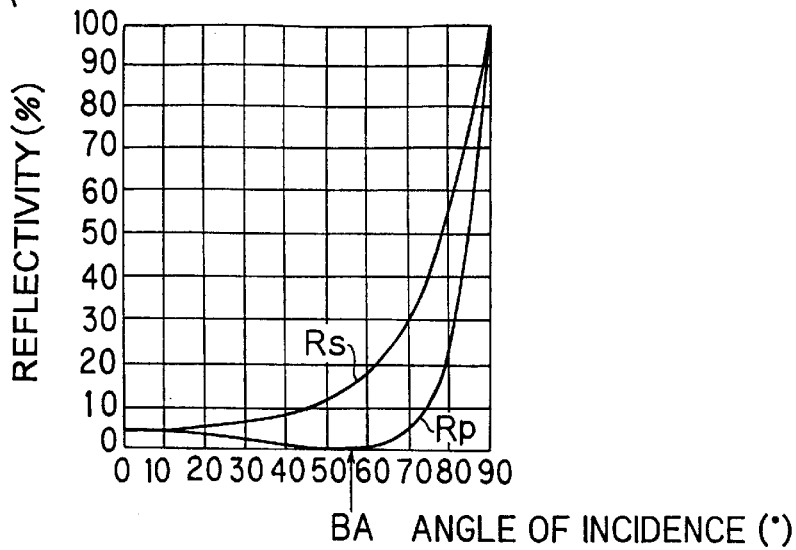
FIGS. 26A and 26B are diagrams showing the relationship between the angle of incidence of light incident on the interface between two media having different refractive indices and the reflectivity of the interface.
Figure 26B:
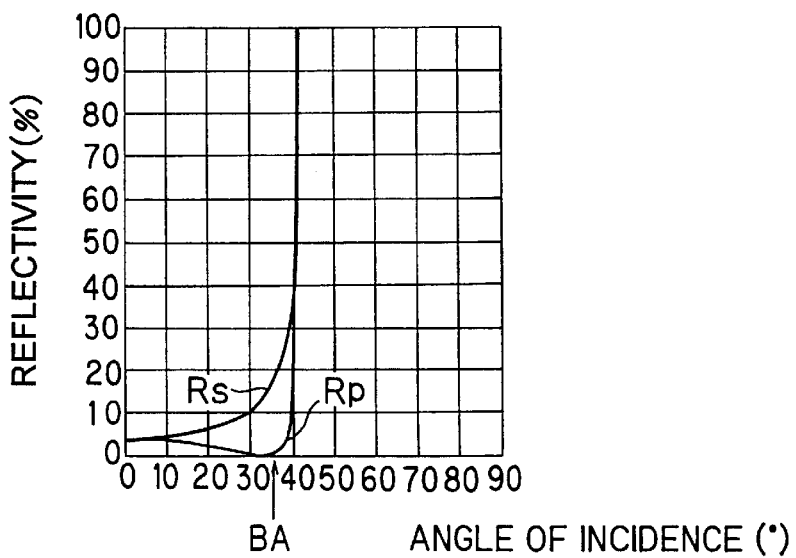
Figure 27:
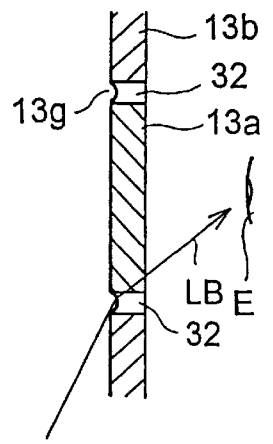
FIG. 27 is a top view illustrating the direction in which the light that has entered the cementing portion between two component pieces travels.

FIGS. 25A and 25B are a side view and a front view, respectively, of the component piece 13a constituting the transparent plate 13R. All the hologram elements mentioned thus far are produced by applying a liquid photosensitive material to the corresponding surface of the component piece 13a by spin coating or the like, and then subjecting it to hologram formation exposure after it has hardened.

Here, the application of the photosensitive material to these surfaces, namely the slant surface on which the hologram element 12R is to be formed, the edge surface on which the hologram element 12a is to be formed, the front surface on which the hologram element 12b is to be formed, the rear surface on which the hologram element 12c is to be formed, and the left and right edge surfaces, and the exposure of these surface are performed on a surface-by-surface basis, i.e. with one surface at a time. Instead of applying the photosensitive material, it is also possible to dip the component piece 13a in a liquid photosensitive material, then take the component piece 13a out, and then, after the photosensitive material has hardened, subjecting the individual surfaces to exposure one by one.

To this component piece 13a having the necessary hologram elements formed thereon, the other component piece 13b is cemented with adhesive to produce the transparent plate 13R. The component pieces 13a and 13b are formed out of materials having equal refractive indices, and are cemented together with adhesive having an equal refractive index. Hologram elements are provided also on the front, rear, and edge surfaces of the component piece 13b so that the transparent plate 13R as a whole exhibits uniform characteristics on each of its front, rear, and edge surfaces. Also in the image display apparatus 6, no light from the outside world is reflected from the interfaces between the hologram element 12R and the transparent plate 13R or from the interfaces between those components and air so as to enter the eyes.

In the image display apparatus 6, the hologram elements 12b and 12c on the front and rear surfaces of the transparent plate 13R are used to function as part of the eyepiece optical system. However, these hologram elements 12b and 12c may be used simply to transmit the light from the outside world and reflect the light incident thereon after being transmitted through the hologram element 12a. It is also possible to omit the hologram element 12a and construct the eyepiece optical system of three hologram elements 12R, 12b, and 12c.

It is also possible to dispose a hologram element between the LCD 11a and the transparent plate 13R and make it function as part of the eyepiece optical system. However, preferable to this arrangement is to provide a hologram element on the surface of the hologram element 12R, because this makes the image display apparatus compact. In a case where the image of the outside world need not be presented, it is also possible to provide, instead of the hologram elements 12b and 12c, ordinary reflective films on the front and rear surfaces of the transparent plate 13R.

In that case, it is not necessary to form a window in the outer surface of the flap portion 20b, and the window 20c formed in the inner surface thereof has only to be large enough to let the light from the hologram element 12R enter the eyes without being intercepted. Moreover, there is no need for the component piece 13b, nor is it necessary to provide hologram elements on the left and right edge surfaces of the component piece 13a.

In an image display apparatus embodying the present invention in which the interfaces between an eyepiece optical system and a plate-shaped member that holds it are so configured as not to reflect light from the outside world that is incident at angles of incidence greater than the Brewster angle toward a viewer's eyes, it is possible to reduce the amount of light from the outside world that is reflected from those interfaces so as to enter the eyes, and thereby present images with high quality. Moreover, in an arrangement in which the interfaces between the eyepiece optical system and ambient air, the interfaces between the plate-shaped member and ambient air, and the interfaces between a first and a second plate-shaped component piece constituting the plate-shaped member are configured in similar manners, it is possible to present images with higher quality.

By determining the angles of those interfaces with respect to the eyes in such a way that light from the outside world that is incident at angles of incidence greater than the Brewster angle is reflected in directions other than the directions that lead to the eyes, even if there is a difference in refractive index between the eyepiece optical system and the plate-shaped member, and irrespective of differences in refractive index between those components and air, it is possible to reduce the amount of reflected light without fail. This permits a wider choice of materials for the eyepiece optical system and the plate-shaped member.

In an arrangement in which the eyepiece optical system and the plate-shaped member have equal refractive indices, or the first and second plate-shaped component pieces have equal refractive indices, and in which these are fitted together directly or cemented together with adhesive having an equal refractive index, no interface exists optically. This makes it possible to eliminate reflected light.

Forming a slit inside the plate-shaped member and filling it with the eyepiece optical system makes it easier to set the angles of the eyepiece optical system and the plate-shaped member with respect to the eyes. In this arrangement, where the eyepiece optical system and the plate-shaped member are in direct contact with each other, by making their refractive indices equal, it is possible to eliminate reflected light easily.

In an image display apparatus embodying the present invention that has an eyepiece optical system composed of two or more hologram elements of which at least the last-stage one is held by a plate-shaped member, it is possible to set the magnification of the presented image freely while suppressing the aberration of the light representing the image satisfactorily. This makes it possible to present images with high quality, and to present large images by using a compact display section.

In an arrangement in which the light from the display section is introduced into the plate-shaped member through an edge portion thereof and is then directed, by being reflected between the interfaces between the plate-shaped member and ambient air, to the eyepiece optical system or to the last-stage hologram element thereof, it is possible to make the plate-shaped member large and thin. This makes it possible to locate the display section outside the visual field and thereby obtain a wide visual field, and to make the image display apparatus lightweight.

In an arrangement in which the plate-shaped member has, at an interface between it and ambient air, a reflective hologram element that reflects the light incident thereon from the display section through the edge portion of the plate-shaped member and that transmits the light from the outside world, it is possible to guide light without totally reflecting it. This makes it easier to set the angle of the display section with respect to the plate-shaped member. By sharing this hologram element as one of the hologram elements constituting the eyepiece optical system other than the last-stage one, it is no longer necessary to dispose a hologram element between the display section and the plate-shaped member. This helps simplify the overall structure of the image display apparatus.

By using, as the eyepiece optical system or the last-stage hologram element thereof, a reflective hologram element that reflects the light from the display section and that transmits the light from the outside world, it is possible to present an image superimposed on part of the image of the outside world, and thus the user can view the whole image of the outside world. This enhances the safety of the image display apparatus. Moreover, it is possible to transmit most of the light from the outside world and thereby avoid the image of the outside world superimposed on the presented image becoming dim. This prevents the user from feeling unnaturalness.

By giving the plate-shaped member an optical power, it is possible to permit even a person with poor eyesight to observe sharp images without using spectacles or the like. Providing the image display apparatus additionally with a mounting member that permits it to be mounted on the user's head enhances its usability.

The surface of the plate-shaped member is coated with a coating portion. As a result, no irregularities develop due to the contraction, expansion, or the like of the adhesive or photosensitive material with which the gap between a plurality of members is filled, and thus no light incident on such a gap is refracted or diffracted. This makes it possible to reduce the amount of unwanted light from the outside world that is directed to the viewer's eyes, and thereby present images with high quality. The coating portion can be formed easily by resin molding or by the sticking of an optical film, and forming it integrally with the plate-shaped member helps reduce the number of components.

What is claimed is:

1. An image display apparatus comprising a display section for displaying an image, an eyepiece optical system, and a transparent plate-shaped member for holding the eyepiece optical system, the image display apparatus being used with the eyepiece optical system placed in front of a viewer's eyes and with the plate-shaped member facing the eyes, the image display apparatus directing light from the display section via the eyepiece optical system to the eyes so that the viewer is presented with a virtual image of the image displayed on the display section and simultaneously permitting light from an outside world to be transmitted through the plate-shaped member so as to be directed to the eyes so that the viewer is presented with an image of the outside world, wherein a boundary surface between the eyepiece optical system and the plate-shaped member is so arranged as not to reflect light from the outside world incident thereon at an angle of incidence greater than a Brewster angle toward the eyes.

2. An image display apparatus as claimed in claim 1, wherein a boundary surface between the eyepiece optical system and ambient air is so arranged as not to reflect light from the outside world incident thereon at an angle of incidence greater than a Brewster angle toward the eyes.

3. An image display apparatus as claimed in claim 1, wherein a boundary surface between the plate-shaped member and ambient air is so arranged as not to reflect light from the outside world incident thereon at an angle of incidence greater than a Brewster angle toward the eyes.

4. An image display apparatus as claimed in claim 1, wherein the plate-shaped member comprises a first plate-shaped component piece and a second plate-shaped component piece, and a boundary surface between the first and second plate-shaped component pieces is so arranged as not to reflect light from the outside world incident thereon at an angle of incidence greater than a Brewster angle toward the eyes.

5. An image display apparatus as claimed in claim 4, wherein the first and second plate-shaped component pieces are in direct contact with each other, and the first and second plate-shaped component pieces have equal refractive indices.

6. An image display apparatus as claimed in claim 4, wherein the first and second plate-shaped component pieces are cemented together with adhesive, and the first and second plate-shaped component pieces and the adhesive have equal refractive indices.

7. An image display apparatus as claimed in claim 1, wherein the boundary surface is slanted at such an angle with respect to the eyes as to reflect light from the outside world incident thereon at an angle of incidence greater than a Brewster angle in a direction other than a direction leading to the eyes.

8. An image display apparatus as claimed in claim 7, wherein the plate-shaped member has a slit formed inside, and the eyepiece optical system is so formed as to fill the slit formed inside the plate-shaped member.

9. An image display apparatus as claimed in claim 1, wherein the eyepiece optical system and the plate-shaped member are in direct contact with each other, and the eyepiece optical system and the plate-shaped member have equal refractive indices.

10. An image display apparatus as claimed in claim 1, wherein the eyepiece optical system and the plate-shaped member are cemented together with adhesive, and the eyepiece optical system, the plate-shaped member, and the adhesive have equal refractive indices.

11. An image display apparatus as claimed in claim 1, wherein the plate-shaped member is so configured that the light from the display section is introduced into the plate-shaped member through an edge portion thereof and is then reflected between boundary surfaces between the plate-shaped member and ambient air so as to be directed to the eyepiece optical system.

12. An image display apparatus as claimed in claim 11, wherein the plate-shaped member has a reflective hologram element provided at a boundary surface between the plate-shaped member and ambient air, the reflective hologram element reflecting the light from the display section incident through the edge portion of the plate-shaped member and simultaneously transmitting the light from the outside world.

13. An image display apparatus as claimed in claim 1, wherein the eyepiece optical system is a reflective hologram element that reflects the light from the display section and simultaneously transmits the light from the outside world.

14. An image display apparatus as claimed in claim 1, wherein the plate-shaped member has an optical power.

15. An image display apparatus as claimed in claim 1, further comprising:

a mounting member for mounting the image display apparatus on a head of the viewer.

16. An image display apparatus as claimed in claim 1, wherein the boundary surface is substantially planar.

17. An image display apparatus comprising a display section for displaying an image, an eyepiece optical system, and a transparent plate-shaped member for holding the eyepiece optical system, the image display apparatus being used with the eyepiece optical system placed in front of a viewer's eyes and with the plate-shaped member facing the eyes, the image display apparatus directing light from the display section through the eyepiece optical system to the eyes so that the viewer is presented with a virtual image of the image displayed on the display section and simultaneously permitting light from an outside world to be transmitted through the plate-shaped member so as to be directed to the eyes so that the viewer is presented with an image of the outside world, wherein the eyepiece optical system comprises two or more hologram elements, of which at least a last-stage one is held by the plate-shaped member.

18. An image display apparatus as claimed in claim 17, wherein the plate-shaped member is so configured that the light from the display section is introduced into the plate-shaped member through an edge portion thereof and is then reflected between boundary surfaces between the plate-shaped member and ambient air so as to be directed to the last-stage hologram element of the eyepiece optical system.

19. An image display apparatus as claimed in claim 18, wherein the plate-shaped member has a reflective hologram element provided at a boundary surface between the plate-shaped member and ambient air, the reflective hologram element reflecting the light from the display section incident through the edge portion of the plate-shaped member and simultaneously transmitting the light from the outside world, the reflective hologram element being shared as one of the hologram elements constituting the eyepiece optical system other than the last-stage one.

20. An image display apparatus as claimed in claim 17, wherein the last-stage hologram element of the eyepiece optical system is a reflective hologram element that reflects the light from the display section and simultaneously transmits the light from the outside world.

21. An image display apparatus comprising a display section for displaying an image, an eyepiece optical system, and a transparent plate-shaped member for holding the eyepiece optical system, the image display apparatus being used with the eyepiece optical system placed in front of a viewer's eyes and with the plate-shaped member facing the eyes, the image display apparatus directing light from the display section through the eyepiece optical system to the eyes so that the viewer is presented with a virtual image of the image displayed on the display section and simultaneously permitting light from an outside world to be transmitted through the plate-shaped member so as to be directed to the eyes so that the viewer is presented with an image of the outside world, wherein a coating portion is provided to coat a plurality of members exposed on a surface of the plate-shaped member facing the viewer's eyes.

22. An image display apparatus as claimed in claim 21, wherein the coating portion is formed by resin molding.

23. An image display apparatus as claimed in claim 21, wherein the coating portion is formed out of an optical film.

24. An image display apparatus as claimed in claim 21, wherein the coating portion is formed integrally with the plate-shaped member.

* * * * *